2 Sheets. Sheet 2.

F. Douglas.
Sash & Blind Machine.

No. 107,671.        Patented Sep. 27, 1870.

Witnesses.           Inventor.
Albert L. Bolles       Frank Douglas.
C. H. Douglas F. Douglas.

Sash & Blind Machine.

No. 107,671. Patented Sep. 27, 1870.

2 Sheets. Sheet 1.

Witnesses.
Albert S. Bolles.
C. H. Douglas.

Inventor.
Frank Douglas.

United States Patent Office.

FRANK DOUGLAS, OF NORWICH, CONNECTICUT.

Letters Patent No. 107,671, dated September 27, 1870.

IMPROVEMENT IN BLIND-SLAT TENONING-MACHINES.

The Schedule referred to in these Letters Patent and making part of the same.

I, FRANK DOUGLAS, of Norwich, in the county of New London and State of Connecticut, have invented certain Improvements in Blind-slat Tenoning-Machines and Blind-stile Boring-Machines, of which the following is a specification.

The nature of my invention consists in providing a machine for cutting blind-slats to a given length, and shaping or forming round tenons thereon, with great rapidity, and in such a manner that the operator has simply to feed the slat-strips to the machine, in any lengths, as fast as he can conveniently handle them, and they are cut to exact lengths, tenoned on both ends, and dropped under the machine in a finished state.

It consists, also, in attaching to the same machine an improved device for boring blind-stiles, which makes them exact duplicates, in a very easy and rapid manner.

Figure 2:
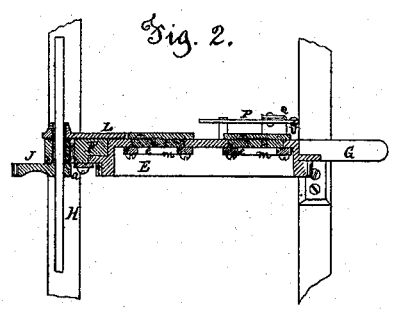
Figure 2 is a sectional view of one of the large disks cut through the center, showing the feed-shaft and small disks.

A is the frame of the machine, which should be substantially constructed, so as to hold all the working parts in true and perfect line.

B is the counter-shaft.

C C, the pulleys that drive the cutter-heads.

D D, the cutter-heads.

E E, the large rotating disks, in which are placed, at equal distances apart, four small rotating disks, $e\ e\ e\ e$.

The disk-frames F F are nicely fitted to the frame A, so as to retain their true line with the machine while being adjusted endwise, and are turned out true inside, for the reception of large disks E E, which are held in place by circular plates $a\ a$, that fit over the projecting edges of disks E E.

The large disks have four openings in each, extending into the opening for the small disks, and corresponding somewhat in size to the openings in the frames F F, which allow the operator to slide the slats to be worked from the rests G G into the centers of the small disks $e\ e\ e\ e$.

These small disks have in each an open parallel slot, $x$, the thickness of the thickest blind-slat, and extending nearly across it, or far enough to admit the center of the widest slats in common use to the center of said disk.

The depth that the slat is admitted into this disk is governed by the adjustable stop $b$, which is so constructed that it may be set on a sufficient angle with slot $x$ in said disk to force the back upper edge of the slat against the top of the said slot $x$; and the spring $d$ presses the front lower edge down on the bottom of slot $x$, thereby placing the center of the blind-slat exactly central with the small rotating disk $e$.

H is a feed-shaft, driven by a belt from shaft B. This shaft runs in bearings I I, and passes through ears on the back of frames F F, which serve as additional bearings.

On this shaft are four segment-gears, two of which, J J, mesh into the cogs on the projecting edges of the large disks E E, and, at each revolution of the feed-shaft H, the said large disks E E are moved one-fourth of a revolution, which brings one of the openings on the edge of each disk E E in line with the openings in the disk-frames F F, the rests G G, and the openings or slots $x\ x$ in the small disks, where they are held, by the spring stops K K, for the reception of the slats to be tenoned, until they are moved forward one-fourth of a revolution further by the next revolution of the shaft H. The stops K K are thrown out by the pressure from the sides of the segment-gears J J, while said gears are in contact with the cogs on the large disks, to allow the said disks to move around one-fourth of a revolution, where they are again held by the said stops during the remainder of the revolution of the feed-shaft.

The two other segment-gears L L upon the shaft H are so arranged as to give one revolution to the two small disks, $e\ e$, which are nearest the feed-shaft H, while the large disks E E are at rest, and the feed-shaft is making the remainder of its revolution.

Secured to the disks $e\ e\ e\ e$, to hold them in place, are circle-plates $m\ m\ m\ m$, in the edge of each of which there is a notch, to receive the spring stops $n\ n\ n\ n$, which stops hold the openings $x\ x\ x\ x$ of the small disks in line with the openings in the large disks, at all times, except when the small disks are making their revolution to form the round tenons on the slat.

After the slat is tenoned, and while the large disks are making another fourth of a revolution, one of the pins $o\ o\ o\ o$, in each disk E E, strikes the lower end of levers P P, and tilts them on pivots Q Q, which brings the other end of the levers P P down upon the inner edge of the slat last tenoned, and forces it out of the disks, under the machine, in a finished state. The springs V V, attached to the lower ends of levers P P, then tilt them back, after the pins $o\ o$ pass them, ready for the next slat.

Figures 3, 4:
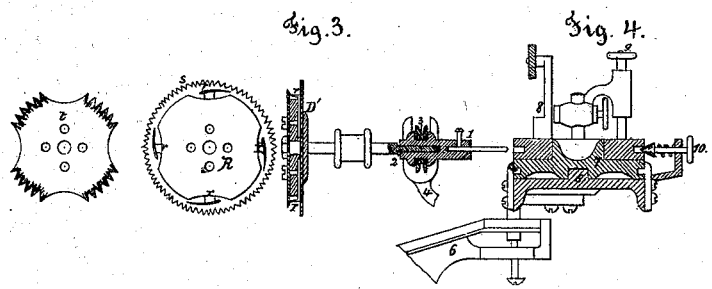
Figure 3 is a sectional view of the cutter-head, with bit-shaft and socket.
Figure 4 is a cross-section of the boring attachment.
Figure 1:
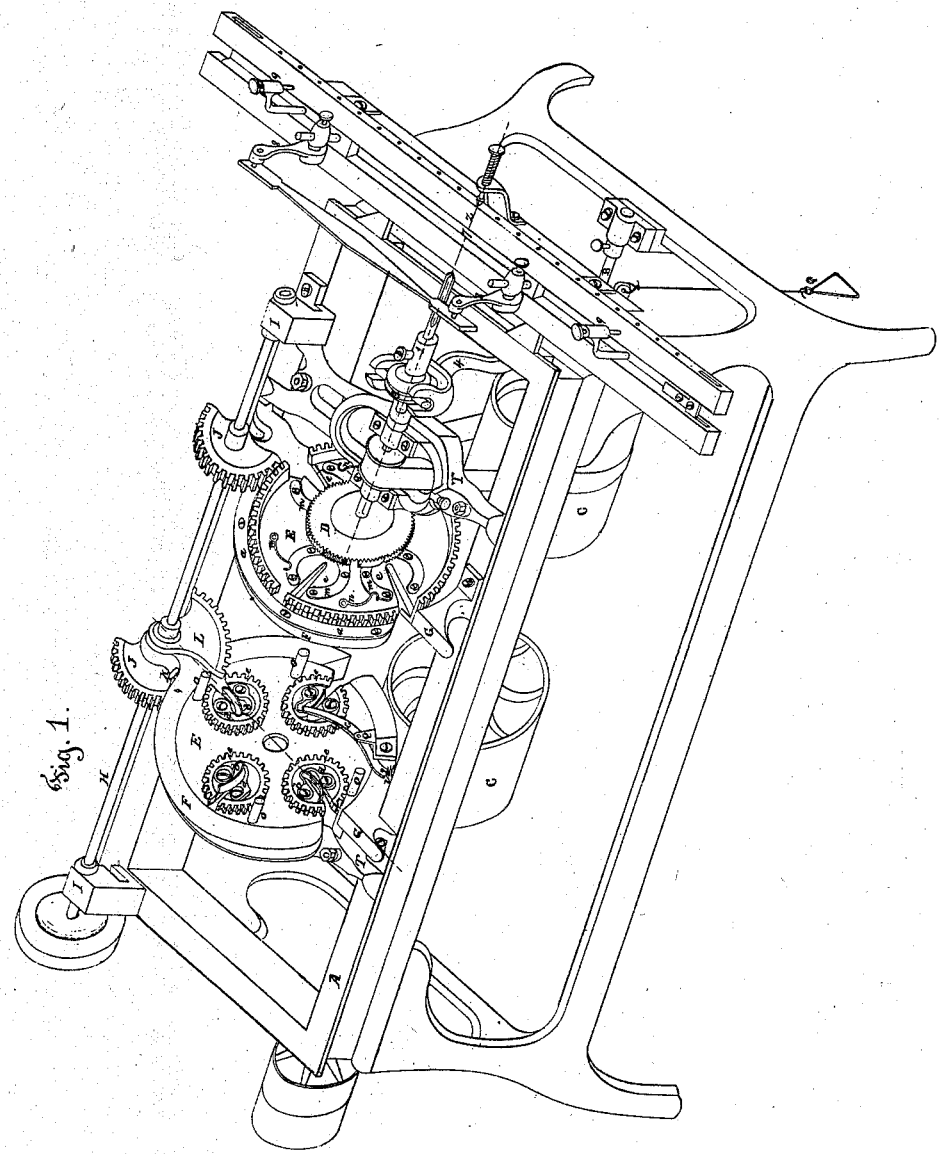
Figure 1 is a perspective view of the entire machine.

The cutter-head, as shown in fig. 3, (which is a sectional view of the cutter-head cut through on line $z$, fig. 1,) is made with a flat circular plate, R, attached to which are four right-angle cutters, $r\ r\ r\ r$. These cutters are held firmly in flat radial grooves the depth of the thickness of cutter-shanks in one side of plate R. The cutting-edges of cutters *r r r r* are about the length of tenon to be cut, and project across the edge or face of plate R.

Depressions are made in the edge of plate R, under each cutter, to allow the chips cut from the slat to pass directly under each of said cutters, between them and the plate, making a smoother and better cut than can be made by a saw-tooth or a cutter-head that carries the chips ahead of or with the cutters. The saw S is for cutting the tenons to the proper length.

The spur-plate *t* may have knife or saw-spurs on its edge, for cutting a smooth shoulder, the same as has been used for many years on tenoning-machines of all kinds.

The saw S, plate R, with cutters *r r r r*, and spur-plate *t*, when clamped on a shaft between two collars, are designated as cutter-head D.

The arbors of cutter-heads D D' run in suitable bearings in frames T T, which are so arranged as to be adjustable endwise with the machine, for gauging the length of the slats, and crosswise of the machine for gauging the size of the tenon required.

The bit-socket 1, for boring the blind-stiles, is made to slide out and in on the projecting end of cutter-head shaft D', and is turned by the feather 2, in said shaft.

The loose collar 3 is provided with trunnions, upon which the forked end of the lever 4, to which the treadle is attached, acts for moving the bit in and out.

The belt from one of the pulleys C, which passes over the small pulley on the shaft of cutter-head D', drives both the cutter-head and the bit.

The bed-piece 5, of the boring attachment, is adjustable up and down in the brackets 6 6.

Upon this bed-piece 5 is the sliding bed, 7, so gibbed and fitted as to hold it in its place, but admits of a free movement endwise.

Attached to one end of bed 7 is a T-shaped stop, against which the end of the mortise in the stick to be bored is placed. Said stick is held down with the eccentric levers 8 8.

After having bored one stile, it is placed on the outside of the sliding bed 7, with the shoulder of the mortise against the said T-gauge, and is held in place by set-screws 9 9, and serves as a pattern to bore others of the same size, which is accomplished in the following manner:

On the outside, attached to the bed-piece 5, with its point in line with the bit, there is a spring-stop, 10, which falls into each hole in the piece clamped on the sliding bed 7, for a pattern, and holds it in place while the bit is boring corresponding holes in the stile to be bored. In this manner an indefinite number of stiles may be bored with rapidity, to correspond exactly with any pattern which may be clamped to the sliding bed 7.

The boring attachment can be used by another operator while slats are being tenoned.

The operator, in tenoning blind-slats, places the heads and disks to proper distances apart to make the required length of slat. He then places the slat to be tenoned, (which may be of any length) on the rests G G, and, when the openings in the large disks come around in line with said rests, (where they make a slight stop,) the slat is entered to the center of the small disks, where it brings up against the gauge-stops *b b*, and is held firmly in place by the springs *d d*.

The large disks are now moved one-fourth of a revolution, when another slat is entered, and when the large disks have moved one-half of a revolution, the slat first entered has made its nearest approach to the cutter-heads, where the segment-gears L L mesh into the cogs on the small disks *e e*, and cause them to make one revolution on their own axis. This produces a round tenon on each end of the slat, and cuts it to its proper length, at the same time that another slat is being entered from the rests G G; and, while the large disks are making another fourth of a revolution, the last slat finished is carried away from the cutter-heads, and thrown out of the disks under the machine, by the levers P P, the operator having nothing to do but to feed the slats to the machine as fast as the openings in the large disks E E present themselves in line with the rests G G.

The cutter-heads being located eccentrically with the large disks from the side in which the slats are entered, the said slats do not come in contact with the cutter-heads until they have been placed in the centers of the small disks, and held there firmly while being carried around in contact with the cutter-heads, which makes the shoulders true and smooth.

The importance of entering the slats to the centers of the small disks, without coming in contact with the cutter-heads while entering, is easily understood, as it is impossible for any one to enter them at both ends exactly at the same time, and in line with the cutters, and, if not, the shoulders of the tenons are cut out of true in the same proportion as they are entered out of true.

I do not claim a single pair of rotating disks in stationary frames, into which the slats are entered in contact with clusters of saws, which cut one side of the tenons while entering, as that is claimed by Seth C. Ellis, in his patent of February 3, 1857.

Claims.

I claim as my invention—

1. The disks E E, in combination with frames F F, disks *e e e e*, segment-gears J J and L L, all constructed and operated in the manner and for the purpose herein specified.

2. The spring stops K K, when constructed as described, and operated by segments J J, for the purpose herein specified.

3. The pins *o o o o*, in combination with disks E E and levers P P, for the purpose of throwing the finished slats out of disks *e e e e*, substantially as herein specified.

4. The mechanism for centering the blind-slat, consisting of stop *b*, spring *d*, parallel slot *x*, and disk *e*, all constructed and operating substantially in the manner and for the purpose herein specified.

5. The combination of saw S, plate R, cutters *r r r r*, and spur-plate *t*, when constructed substantially as and for the purpose specified.

6. The bit-socket 1, when constructed and operated substantially as shown and described.

7. The spring stop 10, in combination with beds 5 and 7, when constructed and operated substantially as described.

FRANK DOUGLAS.

Witnesses:
ALBERT L. BOLLES,
C. H. DOUGLAS.